(12) United States Patent
Koch et al.

(10) Patent No.: US 8,294,627 B2
(45) Date of Patent: Oct. 23, 2012

(54) MICROWAVE ALIGNMENT APPARATUS

(75) Inventors: Stefan Koch, Oppenweiler (DE);
Maysoun Al-Tikriti, Esslingen (DE)

(73) Assignee: Sony Deutschland GmbH, Berlin (DE)

( * ) Notice: Subject to any disclaimer, the term of this patent is extended or adjusted under 35 U.S.C. 154(b) by 557 days.

(21) Appl. No.: 12/088,910

(22) PCT Filed: Oct. 4, 2006

(86) PCT No.: PCT/EP2006/009604
§ 371 (c)(1),
(2), (4) Date: Aug. 21, 2008

(87) PCT Pub. No.: WO2007/039289
PCT Pub. Date: Apr. 12, 2007

(65) Prior Publication Data
US 2009/0051613 A1    Feb. 26, 2009

(30) Foreign Application Priority Data

Oct. 5, 2005 (EP) .................................. 05021742
Nov. 4, 2005 (EP) .................................. 05024085

(51) Int. Cl.
*H01Q 19/10* (2006.01)
(52) U.S. Cl. ........................... 343/753; 343/755
(58) Field of Classification Search .......... 343/753, 343/700 MS
See application file for complete search history.

(56) References Cited

U.S. PATENT DOCUMENTS 5,455,589 A * 10/1995 Huguenin et al. ............ 342/175
5,757,323 A * 5/1998 Spencer ................. 343/700 MS
6,075,492 A * 6/2000 Schmidt et al. ............... 343/753
6,590,544 B1 7/2003 Filipovic
2004/0104852 A1 6/2004 Choi et al.

FOREIGN PATENT DOCUMENTS

| DE | 199 63 003 | | 6/2001 |
| EP | 1 357 395 | | 10/2003 |
| JP | 06006128 A | * | 1/1994 |
| WO | 00 65691 | | 11/2000 |

OTHER PUBLICATIONS

C. Migliaccio, et al., "W-band high gain lens antenna for metrology and radar applications", Electronics Letters, vol. 40, No. 22, Oct. 28, 2004, 2 pages.

Xidong Wu, et al., "Design and Characterization of Single- and Multiple-Beam MM-Wave Circularly Polarized Substrate Lens Antennas for Wireless Communications", IEEE Transactions on Microwave theory and Techniques, vol. 49, No. 3, Mar. 2001, pp. 431-441.

Alison Brown, et al., "Test Results of a 7-Element Small Controlled Reception Pattern Antenna", Proceedings of ION GPS 2001, Sep. 2001, pp. 1-8.

* cited by examiner

*Primary Examiner* — Jacob Y Choi
*Assistant Examiner* — Kyana R McCain
(74) *Attorney, Agent, or Firm* — Oblon, Spivak, McClelland, Maier & Neustadt, L.L.P.

(57) ABSTRACT

A microwave alignment apparatus is operable to align an electromagnetic wave in the microwave range. The microwave alignment apparatus includes a focusing device operable to focus the electromagnetic wave. The microwave alignment apparatus also includes a mounting device operable to mount and/or hold the focusing device. The microwave alignment apparatus is formed as a single integral body.

18 Claims, 5 Drawing Sheets

MICROWAVE ALIGNMENT APPARATUS

Figure 1:
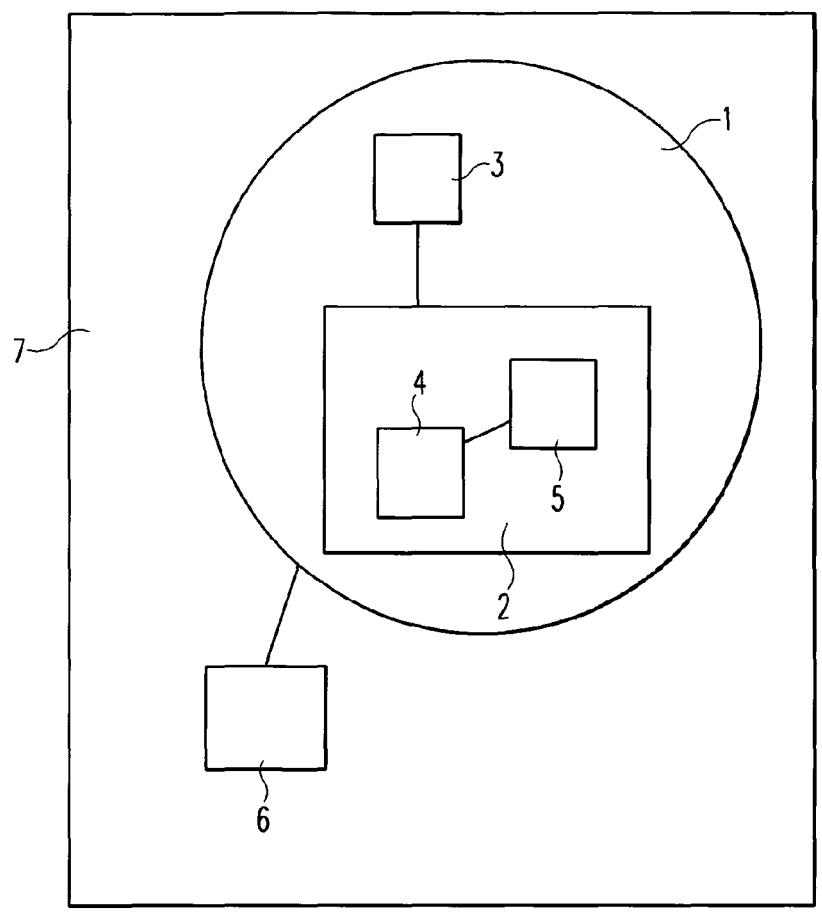

The present invention relates to the field of microwave antenna and particularly to gain or half-power beam widths improving antenna devices in radio frequency of mm-wave (between 30 GHz and 300 GHz) applications by means of lenses and mountings.

The method of the state of the art to mount such lenses is to use a mechanical holder which is very bulky and in addition influences the performance of the antenna system due to reflection at the metal surfaces. To avoid this effect the engineers tend to increase the diameter and/or dimensions of the lens and/or the lens holder which yields to larger systems. In addition the mounting consists of several components and working steps which yields to a high priced product. Both disadvantages are not preferable for mobile devices.

Another method of the state of the art is to use the mechanical horn extension of the antenna to mount the lens. This solution again does have the disadvantage that the size of the antenna system itself is defined by the waveguide horn and is too big in most applications. In addition the manufacturing of a three-dimensional circular or rectangular waveguide horn is much too expensive and therefore not preferable for mobile devices.

Another method of the state of the art comprises a planar structure with several micro antenna elements whereby a dome type of system is added to the structure creating a lens effect. This makes the design very difficult since the dielectric constant of the lens material must be taken into account during the design phase. Especially for mm-wave frequencies (between 30 GHz and 300 GHz) the dielectric constant of the lens material decreases the distances of the patch elements in a way that the design is no longer possible. In addition the "big" dome body adds additional dielectric losses to the antenna system, which reduces efficiency and finally gain of the antenna system.

Finally multiple reflections within the lens must be taken into account and can yield to a decreased performance from case to case.

Another method to control the focus point is to add an additional dielectric material in between the lens and the planar patch antenna, which does have dielectric constant close to air. This mounting procedure does have the disadvantages that due to the foam type of such materials, the focus point distance is very difficult to control. In addition the lens must be glued to the foam and the foam must be glued to the patch by using e.g. epoxy. The epoxy covers areas of the patch elements themselves and therefore influences the performance of the antenna system due to its electrical properties especially for millimeter waves. Eventually the mounting is very complex (several steps) and therefore too expensive and not preferable for mobile devices.

The present invention has the object to provide a microwave alignment apparatus to improve the gain/half-power beam widths/sidelobe of an microwave antenna for mm-wave applications. It is easier and cheaper to manufacture and is smaller than a comparable microwave alignment apparatus of the state of the art. Thus suitable for mobile devices.

Therefore the present invention does not need to increase the size of the antenna and/or the lens for better performance due to influences of the mounting compared to the state of the art. Also the microwave alignment apparatus must have less components and should be created out of a smaller range of materials which do not additionally influence the performance. The control of the focus point is only limited to mechanical manufacturing tolerances due to a simple and less material involving arrangement. Additionally there are only very few dielectric losses to the antenna system of the present invention. The mounting to the antenna is only done in areas where no other electrical parts of the antenna are present and therefore no influences concerning performance (gain, frequency behaviour etc.) are given.

According to the present invention the object is solved by a microwave alignment apparatus operable to align a microwave and comprising a focusing device operable to focus a microwave, a mounting device operable to mount and/or hold the focusing device, characterised in that said microwave alignment apparatus is formed as a one-piece component.

Advantageously the microwave alignment apparatus comprises a symmetric axis.

Advantageously the mounting device comprises a transparent spacer device operable to be transparent for a microwave and a spacer device operable to connect the focusing device and the transparent spacer device at a specific distance.

Advantageously the spacer device comprises a tube.

Advantageously the tube comprises a circular profile.

Advantageously the focusing device comprises a planar area perpendicular to the symmetry axis and limited by the tube.

Advantageously the focusing device comprises a hole extending from the tube along the symmetry axis.

Advantageously the transparent spacer device comprises a concavity with barrier perpendicular to an emitted microwave.

Advantageously the concavity comprises a half-sphere.

Advantageously the concavity comprises a hole on top of the concavity aligned with the spacer device.

Advantageously the focusing device comprises a lens.

Advantageously the lens is rotationally symmetric.

Advantageously a microwave antenna system comprises a microwave source and a microwave alignment apparatus.

Advantageously the microwave source comprises a main lobe.

Advantageously the spacer device comprises a lower edge whereby the lower edge relates preferable to the −3 dB power point of the main lobe of the microwave source.

Advantageously the microwave source comprises a patch antenna.

Advantageously the patch antenna is arranged on a multilayer printed circuit board.

Advantageously the microwave alignment apparatus is connected to the multilayer printed circuit board by connection means.

Advantageously the connection means comprises epoxy resin and/or clamps and/or glue.

Figure 2:
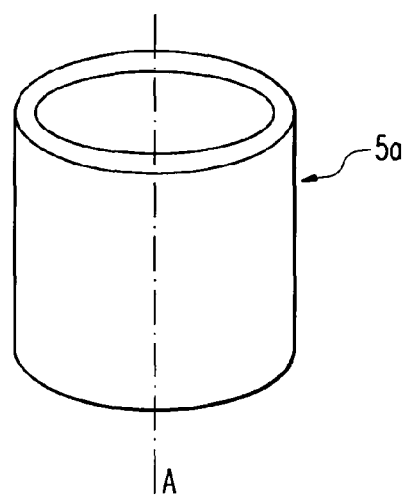
Figure 3:
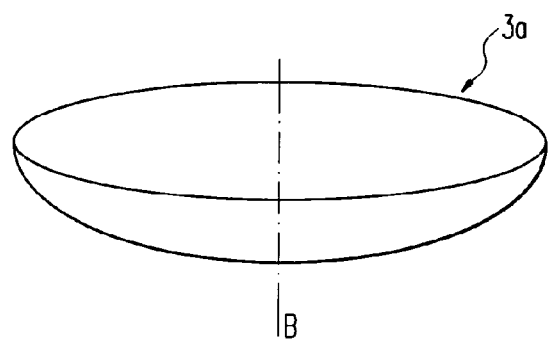
Figure 4:
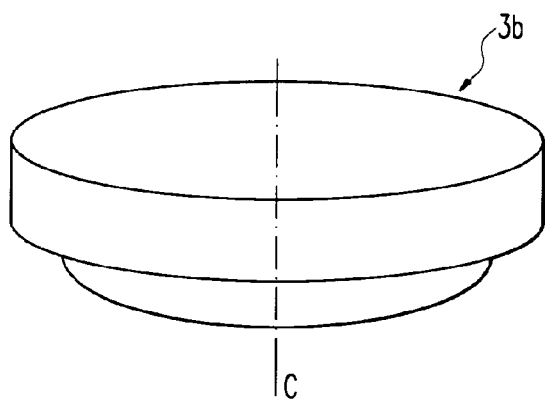
Figure 5:
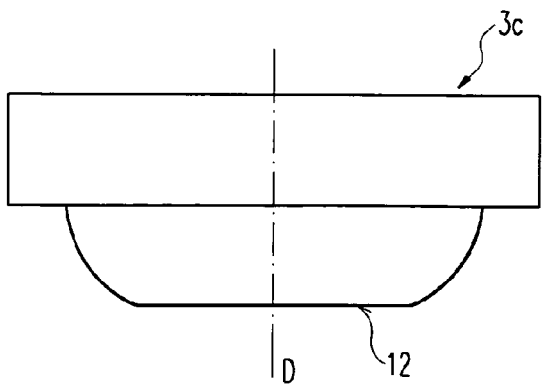
Figure 6:
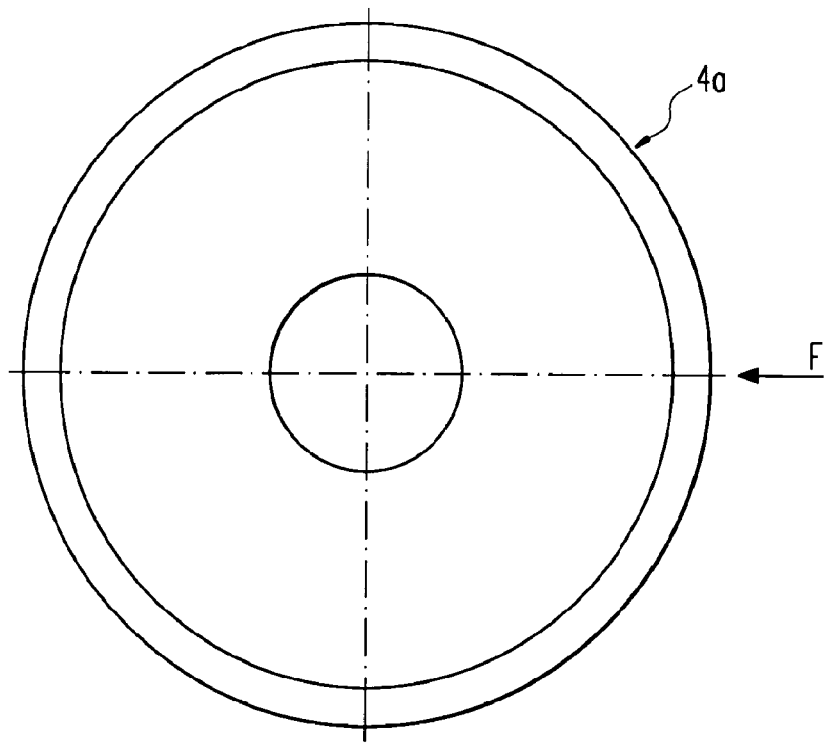
Figure 7:
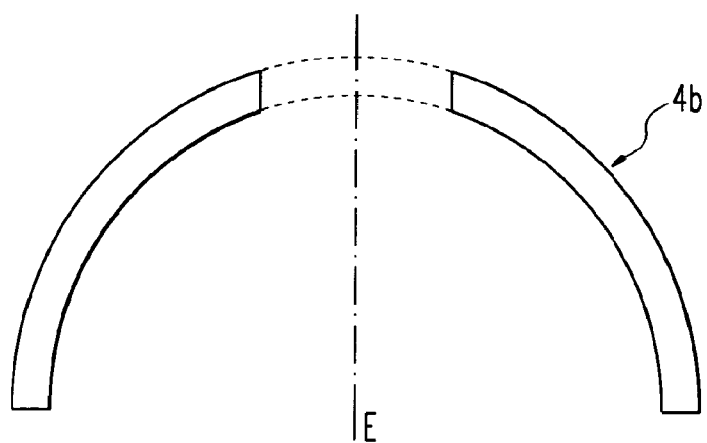
Figure 8:
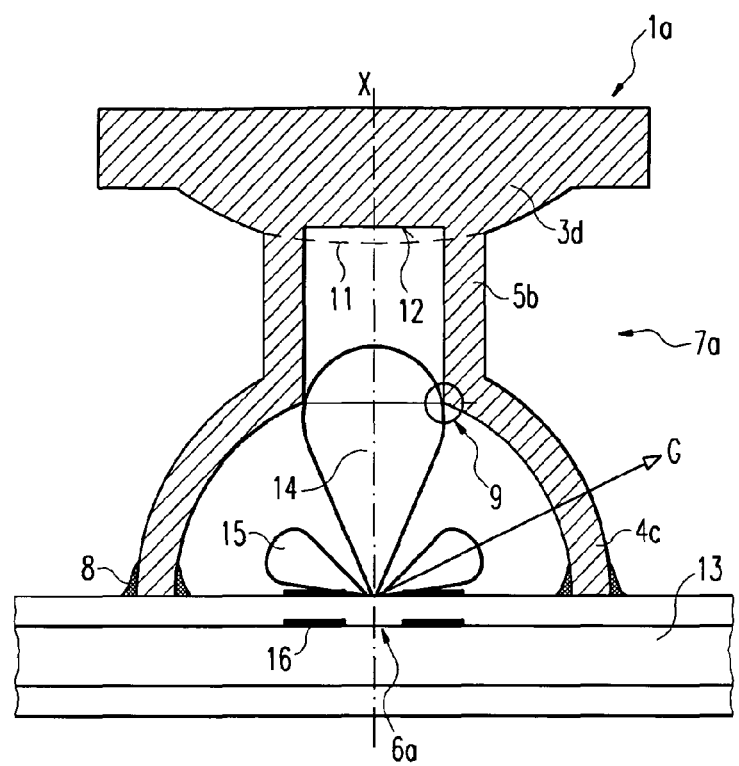
Figure 9:
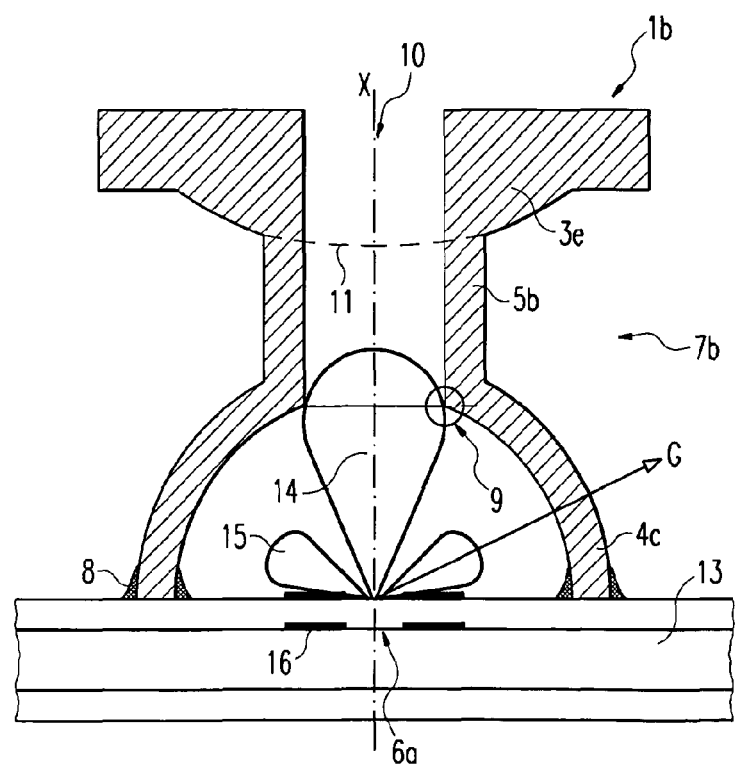

In the following description the invention will be explained in more detail in relation to the enclosed drawings, in which FIG. 1 shows a schematical view of an example of a microwave antenna system comprising an embodiment of the microwave alignment apparatus of the present invention, FIG. 2 shows an example of a spacer device of the present invention, FIG. 3 shows an example of a focusing device of the present invention, FIG. 4 shows an alternative example of a focusing device of the present invention, FIG. 5 shows an alternative example of a focusing device of the present invention, FIG. 6 shows a top view of an example of a transparent spacer device of the present invention, FIG. 7 shows a cross section of an example of a transparent spacer device of the present invention, FIG. 8 shows a cross section of an example of a microwave antenna system comprising an embodiment of the microwave alignment apparatus of the present invention, FIG. 9 shows a cross section of an alternative example of a microwave antenna system comprising an alternative embodiment of the microwave alignment apparatus of the present invention.

Figure 10:
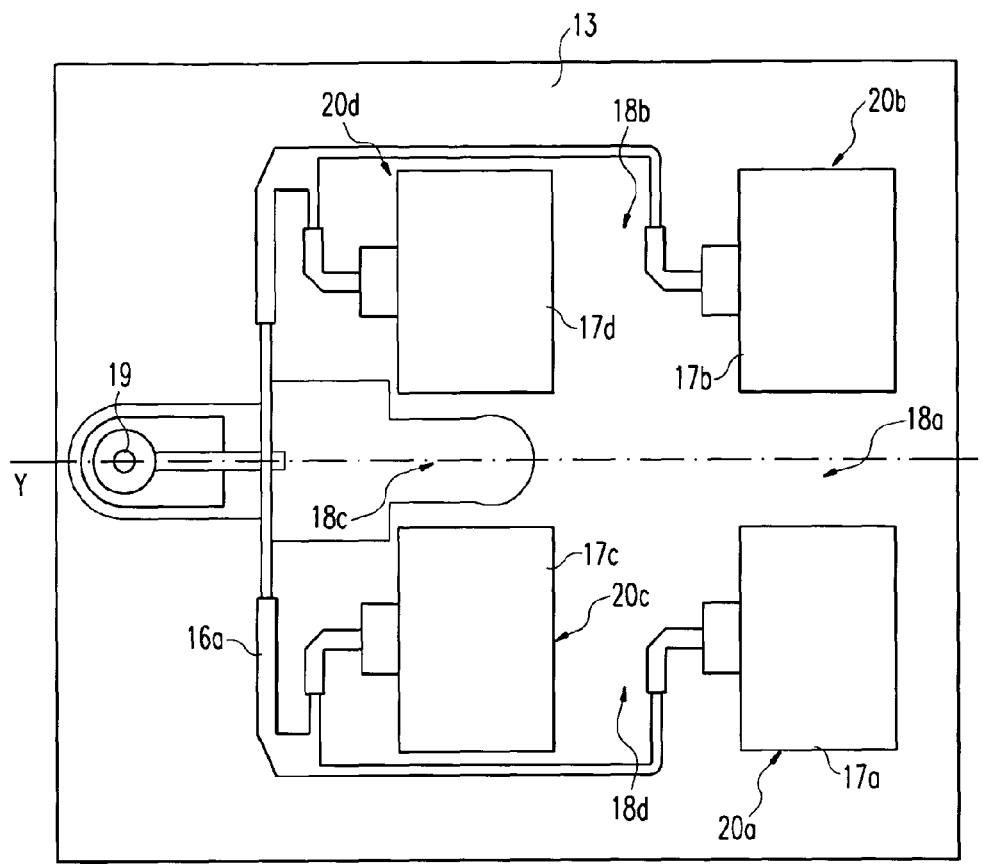

FIG. 10 shows a top view of a microwave source, and

Figure 11:
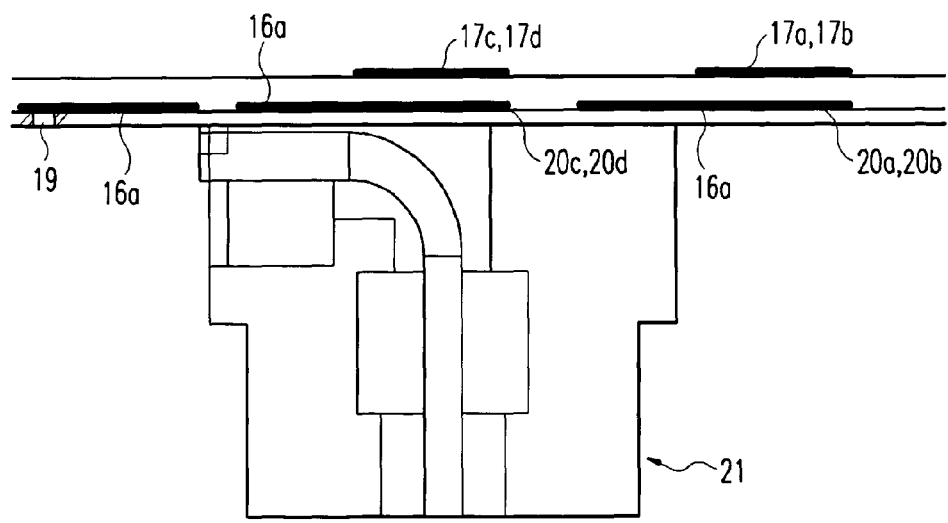

FIG. 11 a cross section of FIG. 10.

FIG. 1 shows schematical view of an example of a microwave antenna system 7 of the present invention comprising a microwave source 6 and an embodiment of a microwave alignment apparatus 1 of the present invention. FIG. 8 and FIG. 9 show concrete embodiments of the microwave antenna system 7. The microwave alignment apparatus 1 comprises a focusing device 3 and a mounting device 2. The mounting device 2 comprises a spacer device 5 and a transparent spacer device 4.

The microwave antenna system 7 is operable to emit and/or receive and amplify the microwaves. It is small enough to be implemented in mobile devices.

The microwave source 6 is operable to emit and/or receive and emits microwaves, which propagate from one point. It can be implemented as a microwave antenna but can also comprise any other type of microwave source 6 operable to emit and/or receive microwaves e.g. with a frequency between 30 GHz and 300 GHz or any other suitable range. Another possible implementation may comprise microwave sources 6, which emit microwaves from different origins or locations instead from one point.

The microwave alignment apparatus 1 is operable to align a microwave into a specific direction and to improve gain and half-power beam widths and sidelobe of the microwave source 6 respectively. Hereby, amplification is achieved by focusing the microwave which has a typical frequency between 30 GHz and 300 GHz. The microwave alignment apparatus 1 is formed as one-piece component preferably from a single material, which is suitable for the application. Nevertheless it is possible to have different components of the same or different materials of the microwave alignment apparatus 1 which are added together by e.g. glue or plugging the components. The microwave alignment apparatus 1 is connected to the microwave source 6 by means which do not (or to a very little extend) deteriorate the performance of the antenna. These means may comprise epoxy resin, glue and/or clamping.

The focusing device 3 is operable to focus a microwave, thus parallelize the from the microwave source 6 emitted microwaves and/or bundle the received microwaves into a focal point which is preferably located at the microwave source 6. The focusing device 3 is made of a material preferably for refracting microwaves and formed as an object to provide gain to microwaves. Preferably the focusing device 3 comprises a lens with a rotationally symmetrical axis operable to focus a microwave point source. Alternatively a lens comprises a straight cylinder cut along its rotational symmetry axis to a half-circular profile which is operable to focus e.g. microwave sources along the symmetry axis of the lens.

The mounting device 2 is operable to mount and/or hold the focusing device and to arrange the focusing device 3 at a specific distance. Preferably the mounting device 2 is made of the same material like the focusing device but can be of another material, too. The mounting device 2 is hollow to keep the dielectric losses of the microwave as low as possible. At least a part of the mounting device 2 is arranged in such a way that the microwave incident perpendicular to the material; thus no reflection or refraction takes place turning this part quasi invisible and transparent respectively for the microwave. The spacer device 5 is operable to arrange the focusing device 3 with the transparent spacer device 4 at a specific distance. The spacer device 5 is the upper part of the mounting device 2 and is formed as a tube like a type of cylinder. The tube's profile perpendicular to its symmetry axis can be circular or elliptical or any other shape advantageously for the application. The diameter of the spacer device 5 is preferable designed in a way that the lower edge is related to the −3 dB power point of the farfield pattern of the microwave source 6. For example the edge can touch, cross or keep a specific distance to the −3 dB power point depending on the application. The spacer device 5 is hollow to keep the dielectric losses of the microwave as low as possible. The transparent spacer device 4 is operable to connect to the microwave source 6 without influencing the performance of the microwave antenna system 7. The transparent spacer device 4 is the lower part of the mounting device 2 and is formed in such a way that the microwave incident perpendicular to the transparent spacer device; thus no reflection or refraction takes place turning this device quasi invisible for the microwave. The transparent spacer device is hollow to keep the dielectric losses of the microwave as low as possible. Eventually the transparent spacer device 4 is formed as a concavity around the microwave source 6 like e.g. a patch antenna. The concavity can be formed as a half-sphere or any other shape advantageously for the application. But there are other forms of the transparent spacer device 4 possible depending on the radiation pattern of the microwave source 6.

The focusing device and the mounting device comprise a common symmetry axis.

FIG. 2 shows an example of a spacer device 5*a* of the present invention. The spacer device 5*a* comprises a hollow cylinder with a circular profile perpendicular to its axis A and has the same functions as the spacer device 5 in FIG. 1.

FIG. 3 shows an example of a focusing device 3*a* of the present invention. The focusing device 3*a* comprises a planar convex lens with a circular profile perpendicular to its axis B and has the same functions as the focusing device 3 in FIG. 1.

FIG. 4 shows an alternative example of a focusing device 3*b* of the present invention. The focusing device 3*b* comprises a planar convex lens with a cylindrical attachment and a circular profile perpendicular to its axis C and has the same functions as the focusing device 3 in FIG. 1.

FIG. 5 shows a cross section of an alternative example of a focusing device 3*c* of the present invention. The focusing device 3*c* comprises a planar convex lens with a cylindrical attachment and a circular profile perpendicular to its axis D and has the same functions as the focusing device 3 in FIG. 1. The lens itself comprises a planar area 12 which does not influence the focusing performance fundamentally. The planar side is perpendicular to the axis D and is located facing in the other direction than towards the cylindrical attachment.

FIG. 6 shows a top view of an example of a transparent spacer device 4*a* of the present invention. The transparent spacer device 4*a* comprises a half-spherical concavity with a concentric circular hole in the middle of the concavity and has the same functions as the transparent spacer device 4 of FIG. 1.

FIG. 7 shows a cross section of an example of a transparent spacer device 4*b* of the present invention viewed in direction of arrow F of FIG. 6. The transparent spacer device 4*b* comprises a half-spherical concavity with a around the axis E concentric circular hole on top of the concavity and has the same functions as the transparent spacer device 4 of FIG. 1.

FIG. 8 shows a cross section of an example of a microwave antenna system 7*a* comprising an embodiment of the microwave alignment apparatus 1*a* of the present invention and an example of a microwave source 6*a*.

The microwave antenna system 7*a* has the same functions as the microwave antenna system 7 described in FIG. 1.

The microwave source 6*a* has the same functions as the microwave source 6 described in FIG. 1. In this example the microwave source 6*a* comprises a patch antenna arranged as four patches on a multilayer board 13 described later in more detail in FIG. 10. The multilayer board 13 comprises additionally a microstrip feeding network 16 with feeding elements below the four patches. This network 16 is operable to feed electrical energy to the patches via the feeding elements which have the same size as the patches which is described later in more detail in FIG. 10. The patch antenna comprises a radiation pattern with a main lobe 14 and two secondary lobes 15 which originate schematically from one point from the middle of the patches.

The microwave alignment apparatus 1*a* has the same functions as the microwave alignment apparatus 1 described in FIG. 1. The microwave alignment apparatus 1*a* is manufactured out of one material by e.g. CNC-machining (Computer Numerical Controlled). For further decrease of manufacturing costs, it is possible to created the microwave alignment apparatus out of one component by e.g. plastic injection molding. The microwave alignment apparatus is joined to the microwave source 6*a*, the multilayer board 13 of the patch antenna respectively, by e.g. epoxy resin 8. Other mounting techniques like screwing or clamping are possible, too. The mounting of the microwave alignment apparatus 1*a* of the present invention to the multilayer board 13 can be realised in an area where there is no electrical influence to the patches and so no influence to the electrical performance.

The transparent spacer device 4*c* has the same functions as the transparent spacer device 4 described in FIG. 1. The transparent spacer device 4*c* is the lower part of the microwave alignment apparatus 7*a* and comprises a half sphere. All rays of the patch antenna hit the sphere in the direction of G perpendicular to the surface and therefore no reflection or diffraction of the rays takes place. The sphere, the transparent spacer device 4*c* respectively, acts as invisible part for the rays. In addition the sphere is hollow to decrease the dielectric losses created by the lens material and to offer an air interface to the patch antenna, so that the patch antenna itself can be checked separately.

The spacer device 5*b* is the middle part of the microwave alignment apparatus 7*a* and comprises a type of cylinder to connect the focusing device 3*d* to the transparent spacer device 4*c*. The diameter of the tube is preferable designed in a way, so that the lower edge is related to the −3 dB power point 9 of the farfield radiation pattern 14 of the patch element itself. It is not mandatory to have this specification for the farfield but can differ from application to application. The spacer device 5*b* is hollow to reduce the dielectric losses within it.

The focusing device 3*d* has the same functions as the focusing device 3 described in FIG. 1. The shape of the focusing device 3*d* inside the area of the spacer device 5*b* is a planar surface 12. Since the microwaves are focus due to the theoretical lens shape 11, the planar surface 12 doesn't remarkable reduces the performance of the focusing device 3*d* but is easier to manufacture.

The focusing device and the mounting device comprise a common symmetry axis X and are axial symmetric, but can be also rotational symmetric.

FIG. 9 shows a cross section of an alternative example of a microwave antenna system 7*b* comprising an alternative embodiment of the microwave alignment apparatus 1*b* of the present invention and an example of a microwave source 6*a*.

The microwave antenna system 7*b* has the same functions as the microwave antenna system 7 described in FIG. 1.

The microwave source 6*a* has the same functions as the microwave source 6*a* described in FIG. 8.

The microwave alignment apparatus 1*b* is the same as the microwave alignment apparatus 1 described in FIG. 1. The microwave alignment apparatus 1*b* is manufactured out of one material by e.g. CNC-machining (Computer Numerical Controlled). For further decrease of manufacturing costs, it is possible to created the microwave alignment apparatus out of one component by e.g. plastic injection molding. The microwave alignment apparatus is joined to the microwave source 6*a*, the multilayer board 13 of the patch antenna respectively, by epoxy resin 8. Other mounting techniques like screwing or clamping are possible, too. The mounting of the microwave alignment apparatus 1*b* of the present invention to the multilayer board 13 can be realised in an area where there is no electrical influence to the patches and so no influence to the electrical performance.

The transparent spacer device 4*c* has the same functions as the transparent spacer device 4 described in FIG. 1. The transparent spacer device 4*c* is the lower part of the microwave alignment apparatus 7*a* and comprises a half sphere. All rays of the patch antenna hit the sphere in the direction of G perpendicular to the surface and therefore no reflection or diffraction of the rays takes place. The sphere, the transparent spacer device 4*c* respectively, acts as invisible part for the rays. In addition the sphere is hollow to decrease the dielectric losses created by the lens material and to offer an air interface to the patch antenna, so that the patch antenna itself can be checked separately.

The spacer device 5*b* is the middle part of the microwave alignment apparatus 7*a* and comprises a type of cylinder to connect the focusing device 3*d* to the transparent spacer device 4*c*. The diameter of the tube is preferable designed in a way, so that the lower edge is related to the −3 dB power point 9 of the farfield radiation pattern 14 of the patch element itself. It is not mandatory to have this specification for the farfield but can differ from application to application. The spacer device 5*b* is hollow to reduce the dielectric losses within it.

The focusing device 3*e* has the same functions as the focusing device 3 described in FIG. 1. In addition the hole in the spacer device 5*b* can be extended to a through-hole 10 going through the focusing device 3*e*. In this alternative embodiment the microwaves are still focus due to the theoretical lens shape 11 with an acceptable degradation of the antenna performance. This alternative embodiment is even easier to manufacture than the one described in FIG. 8.

The focusing device and the mounting device comprise a common symmetry axis X and are axial symmetric, but can be also rotational symmetric.

FIG. 10 shows an example of a microwave source 6 in a top view and FIG. 11 shows a cross section of FIG. 10 with the setup of a patch antenna on a multilayer board 13.

The multilayer board 13 is a PCB (printed circuit board) and comprises four patches 17*a*, 17*b*, 17*c*, 17*d*, a microstrip feeding network 16*a* comprising four feeding elements 20*a*, 20*b*, 20*c*, 20*d* and a via hole 19.

The four patches 17*a*, 17*b*, 17*c*, 17*d* have the same size, comprise four square and even surfaces and are parallely arranged to each other forming four gaps 18*a*, 18*b*, 18*c*, 18*d* between each other. These gaps 18*a*, 18*b*, 18*c*, 18*d* are open to two opposite arranged sides and limited by the parallely arranged edges of two patches 17a & 17b, 17b &17d, 17d & 17c, 17c & 17a. The patches are situated on the top layer of the multilayer board 13.

The microstrip feeding network 16a is arranged on the next layer under the patches and is operable to feed the patches 17a, 17b, 17c; 17d with electrical energy. The feeding elements 20a, 20b, 20c, 20d which are situated right below the patches have the same size as the patches themselves. The microstrip feeding network 16a is the same like the one 16 in FIGS. 8 and 9.

The via hole 19 is connecting the microstrip feeding network 16a with a feeding access 21. In this example the feeding access 21 comprises a BNC connector. The via hole 19, the microstrip feeding network 16a with its feeding elements 20a, 20b, 20c, 20d, the four patches 17a, 17b, 17c, 17d and the feeding access 21 are axial symmetrically arranged along the axis Y.

In the cross section view a part of the microstrip feeding network 16a and the feeding elements 20c & 20d or 20a & 20b form a common thicker layer, respectively.

This patch antenna is only an example for a microwave source to be used with the present invention. It should be noted that other kinds of antennas as well as other kinds of patch antennas can be used with the microwave alignment apparatus of the present invention.

The invention claimed is:

1. A microwave alignment apparatus operable to align an electromagnetic wave in the microwave range, comprising:
   a focusing device operable to focus the electromagnetic wave; and
   a mounting device operable to mount and/or hold the focusing device, wherein the mounting device comprises a transparent spacer device operable to be transparent for a microwave, and a spacer device operable to connect the focusing device and the transparent spacer device at a specific distance, and the focusing device and the mounting device are manufactured from one material as a single, integral, continuous component.

2. The microwave alignment apparatus according to claim 1, wherein the microwave alignment apparatus comprises a symmetric axis.

3. The microwave alignment apparatus according to claim 2, wherein the spacer device comprises a tube.

4. The microwave alignment apparatus according to the claim 3, wherein the tube comprises a circular profile.

5. The microwave alignment apparatus according to claim 3, wherein the focusing device comprises a planar area perpendicular to the symmetric axis and limited by the tube.

6. The microwave alignment apparatus according to claim 3, wherein the focusing device comprises a hole extending from the tube along the symmetric axis.

7. The microwave alignment apparatus according to claim 2, wherein the transparent spacer device comprises a concavity with a barrier perpendicular to an emitted microwave.

8. The microwave alignment apparatus according to claim 7, wherein the concavity comprises a half-sphere.

9. The microwave alignment apparatus according to claim 7, wherein the concavity comprises a hole on top of the concavity aligned with the spacer device.

10. The microwave alignment apparatus according to claim 2, wherein the transparent spacer device is formed such that the electromagnetic wave is incident perpendicular to the transparent spacer device, the transparent spacer device is hollow, and the transparent spacer device is formed as a concavity around a microwave source.

11. The microwave alignment apparatus according to claim 1, wherein the focusing device comprises a lens.

12. The microwave alignment apparatus according to claim 11, wherein the lens is rotationally symmetric.

13. A microwave antenna system, comprising:
   a microwave source operable to emit and/or receive electromagnetic waves in the microwave range; and
   the microwave alignment apparatus according to claim 1.

14. The microwave antenna system according to claim 13, wherein the microwave source comprises a main lobe.

15. The microwave antenna system according to claim 14, further comprising:
   a spacer device, wherein the spacer device comprises a lower edge, whereby the lower edge relates to the −3 dB power point of the main lobe of the microwave source.

16. The microwave antenna system according to claim 13, wherein the microwave source comprises a patch antenna.

17. The microwave antenna system according to claim 13, wherein the microwave alignment apparatus is connected to a printed circuit board by a connector.

18. The microwave antenna system according to claim 17, wherein the connector comprises an epoxy resin and/or clamps and/or glue and/or screws.

* * * * *